US011518568B2

(12) United States Patent
Veneziani et al.

(10) Patent No.: US 11,518,568 B2
(45) Date of Patent: Dec. 6, 2022

(54) LABELLING MACHINE AND METHOD FOR APPLYING LABELS

(71) Applicant: SIDEL PARTICIPATIONS, Octeville-sur-Mer (FR)

(72) Inventors: Nicola Veneziani, Mantova (IT); Matteo Vignali, Mantova (IT)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 204 days.

(21) Appl. No.: 16/529,288

(22) Filed: Aug. 1, 2019

(65) Prior Publication Data

US 2020/0039677 A1 Feb. 6, 2020

(30) Foreign Application Priority Data

Aug. 1, 2018 (IT) ........................ 102018000007745

(51) Int. Cl.
*B32B 41/00* (2006.01)
*B65C 9/40* (2006.01)
(Continued)

(52) U.S. Cl.
CPC .................. *B65C 9/40* (2013.01); *B65C 3/08* (2013.01); *B65C 9/0065* (2013.01); *B65C 9/04* (2013.01);
(Continued)

(58) Field of Classification Search
CPC ........... B65C 9/40; B65C 9/04; B65C 9/1803; B65C 9/0065; B65C 3/08; B65C 2009/407; B65C 2009/1846; B65C 2009/404; B65C 9/42; B65C 9/1819; B65C 9/02; B65C 9/20; B65C 9/26; B65C 9/00;
(Continued)

(56) References Cited

U.S. PATENT DOCUMENTS 5,405,482 A 4/1995 Morrissette et al.
5,560,293 A * 10/1996 Boreali ...................... B41J 2/32
101/288

(Continued)

FOREIGN PATENT DOCUMENTS

CN 106516319 A 3/2017
WO 2018/086712 A1 5/2018

OTHER PUBLICATIONS

Italian Search Report dated May 2, 2019.

*Primary Examiner* — Michael N Orlando
*Assistant Examiner* — Joshel Rivera

(57) ABSTRACT

The present invention relates to a labelling machine (1) for applying labels (2) to receptacles (3) comprising a web (11) having a succession of decorative patterns (15); a cutting unit (12) configured to cut said web (11) so as to obtain individual labels (2); a conveying means (14) configured to advance the individual labels (2); a control unit (17) configured to control a positioning of the web (11) in relation to a reference station (18); a determination device (19) configured to determine and/or detect a relative positioning of the decorative patterns (15) in relation to the reference station (18); and a removal device (20) configured to remove incorrect labels (2) that are determined and/or detected as a function of the relative positioning of the decorative patterns (15) in relation to the reference station (18). Also included is a method for applying labels (2).

16 Claims, 3 Drawing Sheets

(51) Int. Cl.

| | |
|---|---|
| ***B65C 9/04*** | (2006.01) |
| ***B65C 9/18*** | (2006.01) |
| ***B65C 9/00*** | (2006.01) |
| ***B65C 3/08*** | (2006.01) |

(52) U.S. Cl.
CPC .... *B65C 9/1803* (2013.01); *B65C 2009/1846* (2013.01); *B65C 2009/407* (2013.01)

(58) Field of Classification Search
CPC ...... B65H 2301/5151; B65H 2301/543; B65H 2701/192; B65H 2801/75
USPC .................... 156/60, 64, 350, 351, 378, 379
See application file for complete search history.

(56) References Cited

U.S. PATENT DOCUMENTS

| | | | | |
|---|---|---|---|---|
| 7,293,592 | B1 | 11/2007 | Golicz et al. | |
| 2004/0000369 | A1 | 1/2004 | Pituch et al. | |
| 2020/0122872 | A1 * | 4/2020 | Corradini | B41J 2/435 |

* cited by examiner

LABELLING MACHINE AND METHOD FOR APPLYING LABELS

The present invention relates to a labelling machine for applying labels to receptacles.

The present invention also relates to a method for applying labels to receptacles.

Different technologies are known for applying labels to a succession of receptacles, such as bottles, containers or the like.

One of these technologies provides for conveying a web of labelling material, cutting the web to obtain individual labels and the application of the labels thus obtained onto respective receptacles during conveying of the receptacles along a predetermined conveying path and during a rotation of these receptacles about their longitudinal axes. These labels are known as roll-fed labels.

Application of the labels according to this technology is obtained through the use of automatic labelling machines.

A typical labelling machine of the so-called roll feed type comprises:

a conveying apparatus (for example a carousel or a conveyer belt) for conveying the receptacles along a respective conveying path; and a labelling apparatus for applying at least one label to each receptacle during conveying of the receptacles along at least one portion of the conveying path.

The labelling apparatus comprises:

a first conveyor for advancing a web of labelling material along a first advancement path;

a cutting unit for cutting the web of labelling material into individual labels at a cutting station; and a second conveyor configured to advance the individual labels from the cutting station to at least one application station, at which the individual labels are applied to respective receptacles.

It is known that the web of labelling material has a repetition in succession of a decorative pattern defined by unitary decorations.

In use, advancing of the web of labelling material carried out by the first conveyor and, cutting of the web of labelling material carried out by the cutting unit must be coordinated so that each of one individual labels has the decorative pattern. In the case of an incorrect cutting, the labels obtained by the cutting unit have portions of adjacent decorative patterns that are incorrect, as their application to the respective receptacles means that these receptacles must be discarded.

Therefore, it is evident that it is necessary to know with sufficient precision the position of the web of labelling material, in particular decorative patterns and/or unitary decorations, during advancement along the first advancement path.

Moreover, there are different situations during which advancement of the web of labelling material must be positioned and/or synchronised, for example in relation to the cutting unit.

For example, it is known that insertion of a new type of web of labelling material into the labelling machine, for example during a format change, requires a relative positioning of the web of labelling material, in particular of the decorative patterns and/or respective unitary decorations, with respect to the cutting unit to obtain a desired synchronisation between advancement of the web of labelling material and operation of the cutting unit. Often this positioning is carried out by an operator who must align the web of labelling material in relation to a reference station, for example defined by a reference element. However, during the operation by the operator, the precision of alignment is strictly dependent on the experience and/or level of skill of the operator. Moreover, it is known that the web of labelling material is inserted into the labelling machine in the form (in the manner) of a reel that is rotated to cause the unwinding and the advancement of the web. Before the reel comes to an end a splicing step is carried out to avoid the interruption of the production. During the splicing step, a new web of labelling material, of the same type coming from a new reel, is spliced to the web of labelling material coming to an end. In theory, it would be necessary to join the two webs of material for labels so that the decorative patterns and/or the respective unitary decorations are perfectly superimposed. However, in practice, this does not occur and it is necessary to align the new web of labelling material. However, alignment is not immediate and, during a first step following the splicing step, the new web of labelling material is cut generating incorrect labels, namely having at least one portion of the expected decorative pattern and one portion of the subsequent decorative pattern. Application of these incorrect labels causes the receptacles to which they have been applied to be subsequently discarded.

Therefore, in the sector there is the need for improvement of labelling machines, in particular to overcome at least one of the aforesaid drawbacks.

Moreover, in the sector there is a need to improve labelling methods, in particular to overcome at least one of the aforesaid drawbacks.

The object of the present invention is to provide a labelling machine and a method for labelling, which allow at least one of the aforesaid drawbacks to be overcome in a simple and economical manner.

The aforementioned objects are achieved by the present invention, as it relates to a labelling machine and to a method for labelling receptacles as defined in the independent claims.

Alternative preferred embodiments of the present invention are protected in the dependent claims.

For a better understanding of the present invention, a preferred embodiment is described below, purely by way of a non-limiting example and with reference to the accompanying drawings, wherein.

Figure 1:
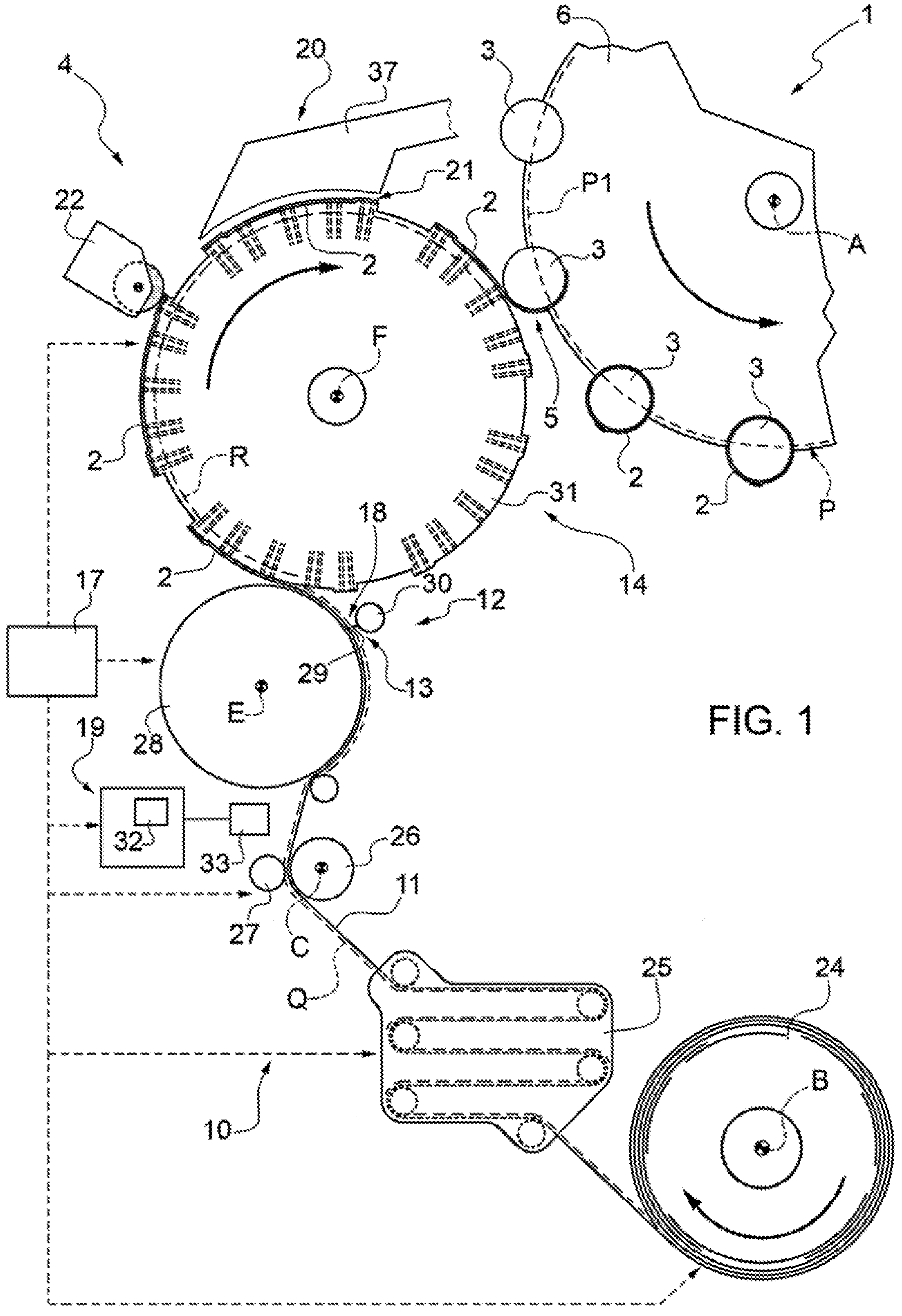
FIG. 1 is a schematic and partial top view of a labelling machine, with parts removed for clarity.
Figure 2:
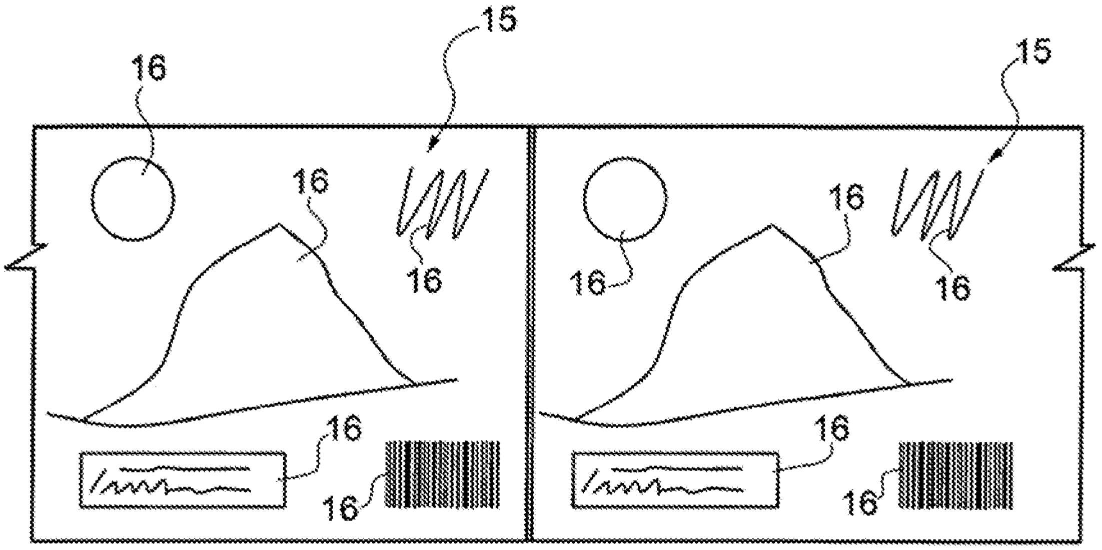
FIG. 2 is a simplified front view of a portion of a web of labelling material, with parts removed for clarity.

With reference to FIG. 1, a labelling machine for applying labels 2 to a succession of receptacles, such as bottles 3, containers or the like, is indicated as a whole with 1.

The following description shall refer, without limitation, to a labelling machine 1 adapted to apply labels 2 to receptacles that can be filled or are filled with a pourable product, in particular a pourable food product, such as carbonated liquids (sparkling water, non-alcoholic beverages, beer, etc.), non-carbonated liquids (still water, fruit juices, wine, etc.), emulsions, suspensions, high viscosity liquids and beverages containing pulp.

Moreover, the following description shall refer, without limitation to bottles 3, in particular made of a thermoplastic polymer, such as polyethylene terephthalate. However, the bottles 3 could also be made of a different material, such as glass, aluminium, etc.

With particular reference to FIG. 1, the labelling machine 1 comprises a labelling apparatus 4 for applying at least one label 2 to each bottle 3 at an application station 5 during conveying of bottles 3 along at least one active portion P1 of a conveying path P.

Preferably but not necessarily, labelling machine 1 further comprises a conveying apparatus for conveying the bottles 3 along conveying path P, in particular through application station 5.

In the non-limiting case illustrated, the conveying apparatus comprises a carousel 6 configured to convey bottles 3 along conveying path P.

In an alternative non-illustrated embodiment, the conveying apparatus could comprise a conveyor belt.

In more detail, carousel 6 is adapted to rotate around a respective rotation axis A and comprises a plurality of retaining units arranged at a peripheral portion of carousel 6 itself. The retaining units are equispaced from one another around the rotation axis A of the carousel 6 and each is adapted to retain a respective bottle 3 during conveying of the bottle 3 along conveying path P. Moreover, each retaining unit is configured at least to allow and/or determine a rotation of the respective bottle 3 around the respective longitudinal axis during application of the respective label 2.

With particular reference to FIG. 1, the labelling machine 1, in particular the labelling apparatus 4, comprises conveying means, and as will be explained hereinafter, the conveying means include several transfer elements such as a first conveyor 10 and/or second conveyor 14. The labelling apparatus also comprises a removal device to remove or extract the labels. Label extraction can be performed at least at one of the transfer elements that are located between a cutting station and an application station.

Particularly, the conveyor means transports the web 11 and/or the label 2 along the cutting station 13 and/or the application station. In other words: the web 11 is transported, for example, by the first conveyor 10, when cutting is performed.

In more detail, the labelling machine, in particular the labelling apparatus, comprises:

a first conveyor 10 for advancing a web 11 of labelling material along a first advancement path Q;

a cutting unit 12 configured to cut web 11 at a cutting station 13 so as to obtain individual labels 2; and a second conveyor 14 configured to advance individual labels 2 along at least one portion of a second advancement path R, in particular from catting station 13 to at least application station 5.

It should be rioted that web 11 comprises a repeated decorative pattern 15, in which each repetition substantially corresponds to the (longitudinal) extension of an individual label 2. In particular, each decorative pattern 15 comprises a plurality of unitary decorations 16. Preferably, decorative patterns 15 are substantially identical and in particular decorative patterns 15 differ from one another at most only in some portions. For example, decorative patterns 15 can comprise information relating to the production date and/or time, to the batch number or the like, in particular information that can be applied in an online procedure.

It should be noted that, in use, web 11 must be cut so that each label 2 comprises a single decorative pattern 15 (and that the label 2 has a desired longitudinal length substantially defined by this decorative pattern 15). In other words, web 11 must be cut at respective theoretical edges (each decorative pattern 15 is interposed between two respective theoretical edges). In the case of an incorrect cut (cuts do not take place at the theoretical edges), the label 2 obtained has respective portions of two subsequent decorative patterns 15 and/or has a different longitudinal length than the desired and/or theoretical length; in this case, an incorrect label 2 is obtained.

However, in the context of the present description, a label must also be considered incorrect if, for example, the alignment of web 11 is such that the application of a further decoration on individual labels 2 would be faulty.

In a preferred non-limiting embodiment, web 11 is made of polymeric material or of paper material.

With particular reference to FIG. 1, labelling machine 1, in particular labelling apparatus 4, further comprises:

a control unit 17 configured to control labelling machine 1, in particular labelling apparatus 4, in at least one set-up configuration, during which web 11 is positioned, in particular through control of first conveyor 10, in relation to a reference station 18 and, preferably but not necessarily, also in an operating configuration during which individual labels 2 are applied to bottles 3;

a determination device 19 configured to determine and/or detect, at least in the set-up configuration, a relative positioning of decorative patterns 15 and/or of respective unitary decoration 16 relating to a (fixed) reference station 18; determination device 19 being in particular operatively coupled to control unit 17; and a removal device 20 configured to (selectively) remove labels 2, in particular incorrect labels, from second conveyor 14 at a removal station 21, at least when labelling machine 1 is, in use, controlled in the set-up configuration.

Preferably but not necessarily, labelling apparatus 4 further comprises a glue application unit 22 configured to apply glue to at least one portion of labels 2 and/or of bottles 3.

In a preferred non-limiting embodiment, labelling apparatus 4 also comprises a storage unit configured to receive and contain web 11, in particular at least one reel 24 on which web 11 is wound. In particular, reel 24 is rotatable around a rotation axis B to allow the unwinding of web 11.

In a preferred non-limiting embodiment, labelling apparatus 4 also comprises a buffer unit 25 arranged downstream of the storage unit along first path Q to prevent excessive tensioning of web 11 during its advancement.

In more detail and with particular reference to FIG. 1, first conveyor 10 comprises:

at least one advancement roller 26 configured to rotate about an axis C, in particular having a vertical orientation, and configured to at least partially control the advancement and/or the advancement speed of web 11;

preferably, an electric motor (not illustrated) to control the rotation of the advancement roller 26 about the axis C (and having its own rotation axis);

preferably, a position sensor (not illustrated), for example an encoder, in particular associated with the electric motor, and configured to provide information relating to the advancement of web 11 with respect to advancement roller 26; and preferably, an auxiliary roller 27 arranged adjacent, in particular tangential, to advancement roller 26 to interpose, in use, web 11 between auxiliary roller 27 and advancement roller 26 to prevent slippage of web 11.

In a preferred non-limiting embodiment, first conveyor 10 further comprises a plurality of sliding rollers (not specifically illustrated), in particular passive, to at least partially guide the advancement of web 11.

Preferably but not necessarily, first conveyor 10 further comprises an auxiliary conveying unit, in particular an auxiliary drum 28 rotatable around an axis E, configured to advance web 11 along a final portion of path Q and, in particular, to support the transfer of individual labels 2 to second conveyor 14. In particular, auxiliary drum 28 is arranged downstream of advancement roller 26 and adjacent to second conveyor 14.

Preferably, the auxiliary drum 28 is configured to generate a vacuum ouch that the web 11 and/or the labels 2 are held by the vacuum during their transport by the auxiliary drum 28. According to a preferred embodiment the removal device 21 is located immediately downstream to the cutting section 13 and removes the incorrect labels 2 from the first conveyor means 10, i.e. directly after cutting the label 2, preferably from the auxiliary drum 28. Furthermore, it is conceivable that the auxiliary drum 28 is configured such that suction automatically stops in a specific section of the auxiliary drum 28, when the auxiliary drum 28 passes a transfer section for transferring the labels 2 from the auxiliary drum 28 to the second conveyor 14, for example the conveyor drum 31.

With particular reference to FIG. 1, in the specific case illustrated, cutting unit 12 is configured to cut web 11 in a manner defined "in contact". In particular, cutting unit 12 comprises at least one blade 29 and, preferably, at least one counter-blade 30, in particular configured to cut web 11 in mutual cooperation.

In an alternative embodiment, cutting unit 12 could be configured to cut web 11 in a manner defined "without contact", for example cutting unit 12 could comprise a laser.

With particular reference to FIG. 1, second conveyor 14 comprises a conveyor drum 31 rotating about an axis F and configured to retain, in particular through suction, labels 2 during their advancement along at least one portion of path R.

Preferably but not necessarily, control unit 17 can comprise a PLC ("Programmable Logic Controller") and/or a microprocessor and/or a microcontroller.

In a preferred non-limiting embodiment, control unit 17 is configured to (directly and/or indirectly) control, at least partially, the operation of cutting unit 12, in particular the respective specific point in time of the cutting of web 11.

In particular, the reference station 18 is defined by cutting unit 12 and is more specifically arranged at cutting station 13. Alternatively, reference station 18 can be defined by determination device 19 or by any other reference.

Advantageously, determination device 19 is configured to determine and/or detect, in use, the advancement of one or more incorrect labels 2 by second conveyer 14 as a function of the relative positioning of the respective decorative patterns 15, and/or of at least one respective unitary decoration 16, in relation to reference station 18 and to control at least removal device 20 so as to remove the incorrect label/labels from second conveyor 14.

Preferably but not necessarily, determination device 19 is also configured to determine and/or detect, in use, the advancement of one or more incorrect labels 2 also as a function of the advancement position of web 11 and, in particular, also of the advancement speed of web 11.

It should be noted that the relative positioning of decorative patterns 15 makes it possible to determine and/or detect and/or calculate the relative positioning of the cutting by cutting unit 12 in relation to the respective decorative patterns 15. In particular, determination device 19 is configured to determine the respective specific point in time in which the theoretical edges of the respective labels 2 are at cutting station 13 and whether cutting unit 12 is adapted to cut, during the respective specific point in time, web 11. If so, a label 2 with only the respective decorative pattern 15 is obtained (the label 2 obtained in this way is a correct label 2); if not, web 11 is cut so that the label 2 obtained contains portions of two subsequent decorative patterns 15 and/or has a different longitudinal length than the desired length (i.e., the label 2 is an incorrect label 2). Cutting unit 12 is partly controlled to operate as a function of the respective relative positioning of decorative patterns 15; however, it is not always possible to synchronise operation of the various components (first conveyer 10, second conveyer 14, conveying apparatus 6, cutting unit 12) of labelling machine 1 to obtain the cutting at the theoretical edges. This latter can occur in particular after insertion of a new web 11 and/or after splicing between a web 11 in use and a new web 11, as the new web 11 is not correctly positioned in relation to reference station 18.

In a preferred non-limiting embodiment, the control unit 17 is configured to position (at least in the set-up configuration) the web 11 in relation to the reference station 18 through at least controlling the first conveyor 10, in particular the advancement roller 26, more in particular through controlling the rotation speed of the advancement roller 26. In particular, once the web 11 is positioned correctly in relation to the reference station 18, the control unit 17 is configured to control the labelling machine 1 in the operating configuration.

According to a preferred non-limiting embodiment, determination device 19 comprises at least one processing unit 32, which is configured to determine and/or detect, as a function of the relative positioning of decorative patterns 15 in relation to reference station 18, whether an individual label 2 has portions of two subsequent decorative patterns 15 and, if so, is configured to mark, in particular virtually, the respective label 2 as an incorrect label 2.

Preferably but not necessarily, determination device 19 also comprises at least one sensor 33, for example an optoelectronic sensor and/or a video camera, configured so as to generate a detection signal $S_d$ (see FIG. 3) indicative of visual characteristics of decorative patterns 15, and in particular arranged upstream of cutting unit 12 along path Q.

Preferably but not necessarily, processing unit 32 is operatively coupled to sensor 33 and is configured to receive and process the detection signal $S_d$ so as to determine the relative positioning of decorative patterns 15 and, in particular, also the effective length of the respective labels 2.

The detection signal $S_d$ can be an analogue signal variable in time, for example indicative of the light intensity of the image of label 2 and, in particular, determination device 19 can in this case be configured to store a corresponding digital signal, variable in time.

Alternatively, according to a particular aspect of the present solution, the characterising information is indirectly linked to the aforesaid detection signal $S_d$.

Preferably but not necessarily, determination device 19 also comprises at least one memory (not illustrated) configured to store respective characterisation information associated with decorative patterns 15, for a number of different types and/or formats of decorative patterns 15 (and different types and/or formats of labels 2).

Preferably but not necessarily, processing unit 32 is operatively coupled to the memory and, at least when labelling machine 1 is controlled in use in the set-up configuration, it is configured so as to recover from the memory, as a function of a current type and/or format of decorative patterns 15 and/or of labels 2, the respective characterisation information, and so as to determine the relative positioning of decorative patterns 15 and, in particular the actual length of the respective labels, based on comparison between the characterisation information and information associated with the detection signal $S_d$.

Preferably but not necessarily, the memory comprises a database configured to store, in association with each format and/or each type of label 2 that can be processed by labelling machine 1, characterisation information indicative of decorative pattern 15 and of the type and/or format of label.

Preferably but not necessarily, processing unit 32 is also configured, in particular with labelling machine 1 being controlled in a learning configuration, to obtain and store in the database the respective characterisation information for each type and/or each format of decorative patterns 15 and/or of labels 2. In an alternative embodiment, the database can contain the respective information, for example loaded into the database by an operator.

In a preferred non-limiting embodiment, in particular with labelling machine 1 being controlled in the learning configuration, processing unit 32 is configured so as to obtain characterisation information based on the detection signal $S_d$ generated by sensor 33 in association with a number of reference decorative patterns of web 11.

Preferably but not necessarily, sensor 33 is configured to obtain the detection signal $S_d$ as a function of variations of contrast, and/or colour and or light intensity in the image of decorative patterns 15. In particular, reference signal $S_d$ comprises a plurality of leading edges and trailing edges and the characterisation information has values of the advancement position corresponding to the leading and/or trailing edges.

According to a non-limiting embodiment, sensor 33 can comprise a light emission element, such as an LED, and a light detection element, such as a photocell or a similar photodetector.

In a preferred non-limiting embodiment, sensor 33 is, for example, a contrast sensor, adapted to detect contrast differences (for example different shades of grey).

In another preferred non-limiting embodiment, sensor 33 is a sensor capable of detecting chromatic differences inside the image of the label and/or further characteristics of the image, such as differences of reflectivity or luminescence.

According to at least this last preferred non-limiting embodiment, sensor 33 is adapted to determine and/or monitor and/or detect a specific colour expressed in percentiles of a plurality of colours, such as red, green and blue. Preferably but not necessarily, sensor 33 is of the RGB (red-green-blue) type.

Preferably but not necessarily, control unit 17 is configured to control sensor 33 so as to set the percentiles of the plurality of colours as a function of the label type and/or format. In particular, in this way control unit 17 can control the specific colour to be determined and/or monitored and/or detected by sensor 33. In other words, in this way it is possible to define the colour to which sensor 33 is susceptible, in particular for a specific label type and/or format.

In this embodiment, in use, sensor 33, for example after a label type and/or format change, is controlled by control unit 17 to record and/or determine a specific colour present on the label type and/or format.

Preferably but not necessarily, the specific setting (in percentiles of the plurality of colours) of sensor 33 for a specific label type and/or format is stored in the memory, in particular together with the characterisation information associated with decorative patterns 15.

Preferably but not necessarily, in use and in particular during operation of labelling machine 1, the specific setting is obtained by control unit 17 to control sensor 33.

Figure 3:
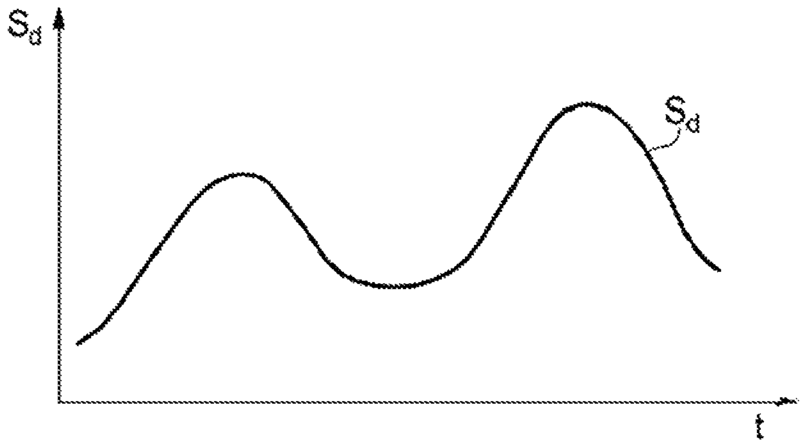
FIG. 3 shows an example of the trend in time of a detection signal generated by a determination device of the labelling machine of FIG. 1.

With particular reference to FIG. 3, detection signal $S_d$ is for example a contrast signal, with square wave profile, having a first (high) value in the case in which the contrast detected is greater than a given threshold, and a second (low) value in the case in which the contrast detected is below the same threshold (or a different threshold, in the case of detection with hysteresis).

Therefore, the detection signal $S_d$ has a plurality of leading edges and trailing edges, spaced in time from one another, as a function of the characteristics of the label image.

In a possible non-limiting embodiment, determination device 19 is configured to associate the aforesaid detection signal $S_d$ with the information provided by the position sensor associated with the electric motor, in particular with the rotation angle φ of the electric motor with respect to the rotation axis of the electric motor and to axis E.

Figure 4:
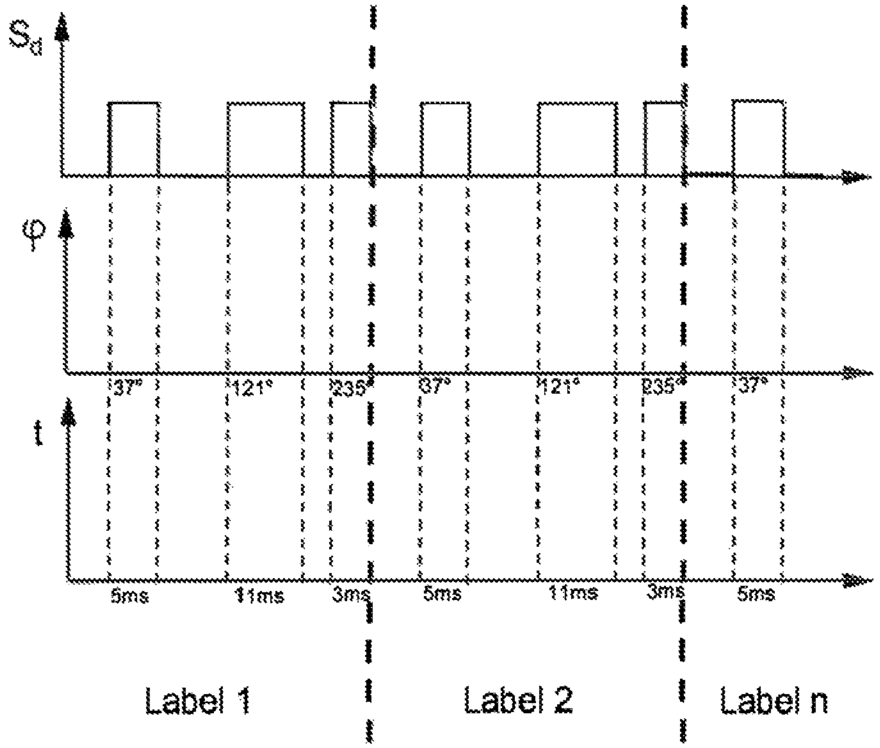
FIG. 4 shows the trend in time of further signals relating to the operation of the determination device of the labelling machine of FIG. 1.

In more detail, determination device 19 is configured to determine the corresponding value of the rotation angle φ at each leading and trailing edge of the detection signal $S_d$ (in the example illustrated in FIG. 4, the leading edges of the detection signal $S_d$ occur at the values 37°, 121° and 235° of the rotation angle φ.

This sequence of position values is repeated in a substantially constant manner for each decorative pattern 15 of web 11 (of a specific type and/or format).

Therefore, in this embodiment, determination device 19 stores in the database, in association with the label type and/or format in question, for example in the form of a vector, the set of the aforesaid values of the rotation angle φ, at which the edges, leading in the example, of the detection signal $S_d$ occurred.

Likewise, it should be noted that determination device 19 can determine the values of the rotation angle φ at the trailing edges of the same detection signal $S_d$.

Moreover, as illustrated in FIG. 4, determination device 19 can obtain time information associated with each of the aforesaid leading (and/or trailing) edges, memorising the point in time in which the same leading (and/or trailing) edges occur.

In substance, in this embodiment, the characterisation information of the image of labels 2 consists, indirectly, of the position values associated with the advancement of web 11; in other words, the aforesaid set of values of the rotation angle φ in this case consists of the "footprint" of the label.

This embodiment can be advantageous, as it allows, to obtain the characterisation information of the labels, the use of data that can be detected with high accuracy, such as the aforesaid values of the rotation angle φ. Moreover, the size and the complexity of the data stored can in this way be advantageously decreased.

With particular reference to FIG. 1, removal station 21 is arranged upstream of application station 5 along path R and/or Q. Alternatively, application station 5 could be arranged upstream of removal station 21. In particular, the removal station 21 is located immediately downstream of the cutting station 13. Preferably the removal station 21 removes the labels 2 from the auxiliary drum 28. For example, the auxiliary drum 28 is configured to reduce or eliminate a suction being intended to hold the labels 2 during their transport. Consequently, it is possible to reduce or eliminate the suction/vacuum such that removing the incorrect labels 2 is simplified for the removal device 20. Preferably the control unit 17 is configured to control a suction power in order to reduce and/or eliminate vacuum generated inside the auxiliary drum 28, in particular when an incorrect label 2 has been produced.

In a preferred non-limiting embodiment, control unit 17 is configured, at least in the set-up configuration of labelling machine 1, to control second conveyor 14 so that an incorrect label 2, in use, is fed towards removal station 21. In the non-limiting embodiment illustrated, control unit 17 controls the suction that allows conveying drum 31 to retain the labels so that an incorrect label 2 is released at removal station 18.

Preferably but not necessarily, removal device 20 comprises:

a suction assembly (not illustrated) configured to generate a suction force on the (incorrect) labels (2) to remove the (incorrect) labels 2 from second conveyor 14, in particular from conveyor drum 31; and in particular a removal channel 37 configured to receive and remove (again through suction by the suction assembly) the (incorrect) labels 2 removed from second conveyor 14.

In a preferred embodiment, removal device 18, in particular removal channel 37, is arranged peripherally adjacent to second conveyor 14, in particular to conveyor drum 31 at removal station 21.

In an alternative embodiment, the removal device could be of mechanical type. In particular, a removal device of mechanical type could also be et least partially incorporated in second conveyor 14.

The conveying means include several transfer elements, including the auxiliary drum 28, and the removal device 20 can be positioned at least at one of these transfer elements that are located between the cutting station 13 and the application station 5. Preferably, the removal device 20 is located at the auxiliary drum 28, which holds the web 11 during the cutting and transports the produced labels 2.

In use, control unit 17 controls labelling machine 1 between the set-up configuration and the operating configuration to operate labelling machine 2 respectively at least in a set-up step and in an operating step.

In particular, during the set-up step, web 11 is positioned in relation to reference station 18.

In a preferred non-limiting embodiment, the set-up step is carried out after insertion of a new type and/or format of web 11 and/or after splicing of a web 11 in use with a new web 11.

During the operating step, labelling machine 1 applies labels 2 to bottles 3. In particular, conveying apparatus 6 conveys bottles 2 along path P and labelling apparatus 4 applies labels 2 to bottles 3 at application station 5.

In more detail, operation of labelling machine 1 comprises the following steps:

advancing web 11 along path Q;

cutting web 11 at cutting station 13 to obtain the individual labels 2;

advancing individual labels 2 from cutting station 13 to at least application station 5;

applying individual labels 2, at least during the operating step, at application station 5 to respective bottles 3; and positioning web 11 in relation to reference station 18 at least during the set-up step.

Advantageously, during the positioning step, at least the following sub-steps are carried cut:

determining and/or detecting the relative positioning of decorative patterns 15 with respect to reference station 18;

determining and/or detecting the advancement of an incorrect label 2 as a function of the relative positioning of decorative patterns 15 with respect to said reference station 18; and removing incorrect labels 2 during the advancement step of labels 2 at a removal station 21.

As mentioned above, the conveying means include several transfer elements, and extraction or removal can be performed at least at one of the transfer elements that are located between the cutting station 13 and the application station 5.

It should be noted that the sub-steps of determining and/or detecting the relative positioning and the advancement of an incorrect label 2 and of removing the incorrect labels 2 can also be carried out during the operating step of labelling machine 1.

It should also be noted that the application step can also be carried out during the positioning step.

In a preferred non-limiting embodiment, during the positioning step, first conveyor 10, in particular advancement roller 26, is controlled so that web 11, in particular decorative patterns 15, are positioned so that cutting of web 11 takes place at respective theoretical edges.

In a preferred non-limiting embodiment, during the sub-step of determining and/or detecting, an incorrect label 2 is determined and/or detected as a function of the relative positioning of decorative patterns 15 with respect to said reference station 18 if an individual label 2 has portions of two successive decorative patterns 15; in this case, the respective label 2 is marked, in particular marked virtually, as incorrect label 2.

In particular, in these cases, cutting of web 11 does not take place at the theoretical edges of the respective labels 2.

In a preferred non-limiting embodiment, during the step of determining and/or detecting the relative positioning:

sensor 33 generates the respective detection signal $S_d$;

processing unit 32 receives and processes the detection signal $S_d$ to determine the relative positioning of the respective decorative patterns 15 and recover from the memory, as a function of the current type and/or format of decorative patterns 15, the respective characterisation information, and determines the relative positioning based on comparison between the characterisation information and the information associated with the detection signal $S_d$.

In more detail, processing unit 32 obtains the characterisation information based on the detection signal $S_d$ generated by sensor 33 in association with a number of reference decorative patterns 15 of web 11.

In a preferred non-limiting embodiment, during the advancement step of web 11, the position sensor determines and/or detects the advancement position of web 11 and, during the step of determining and/or detecting the feed of the incorrect label, the incorrect label is detected also as a function of the advancement position of web 11 and in particular also of the advancement speed of web 11.

In more detail, determination device 19, in particular processing unit 31, is configured to associate the aforesaid detection signal $S_d$ with the information provided by the position sensor, in particular the rotation angle φ of the electric motor with respect to the rotation axis.

In a preferred non-limiting embodiment, a learning step is also provided during which labelling machine 1 is controlled by control unit 17 in the learning configuration.

In detail, during the learning step the following sub-steps are carried out:

preparing labelling machine 1 in the correct position;

advancing a number of decorative patterns 15 (labels 2) of web 11 along path Q;

determining and/or detecting by sensor 33 visual characteristics of decorative patterns 15 (of labels 2) and generating the respective detection signal $S_d$;

acquiring the respective detection signal $S_d$ by determination device 19 (this detection signal $S_d$ being substantially the same for each label 2); and storing in a database the characterisation information associated with label 2, obtained as a function of the detection signal $S_d$.

In particular, the aforesaid sub-steps of the learning step are repeated for each format and/or type of label and/or decorative pattern that will be used subsequently for the set-up step and for the operating step by labelling machine 1, so as to "populate" the database with the characterisation information for each possible type and/or format of label subsequently used.

In a preferred non-limiting embodiment, during the removal step, the incorrect label 2 is fed by second conveyor 14 towards removal station 21 and, at this latter, it is removed, in particular through the application of a suction force on the incorrect label 2.

In more detail, the incorrect label 2 is drawn into removal channel 37 and is removed in removal channel 37.

By examining the characteristics of labelling machine 1 and of the respective labelling method the advantages that can be obtained, according to the present invention, are evident.

In particular, with labelling machine 1 and the method described it is possible, in a simple and economical manner, to position, in particular while labelling machine 1 is controlled in the set-up configuration, web 11 in relation to reference station 18. This positioning means that at least in the subsequent steps web 11 is positioned in a substantially correct manner in relation to reference station 18 to obtain labels 2 that have the correct decorative patterns 15. However, in particular during the set-up step, but also during the operating step, it is possible to remove incorrect labels 2 without them being applied to bottles 3 and without them being able to cause other problems to the operation of the labelling machine 1. Moreover, since the extraction or removal is performed at least at one of the transfer elements that are located between the cutting station 13 and the application station 5, the case of the presence of bottles 3 with incorrect labels 2 that must be discarded does not occur.

A further advantage lies in the fact that control unit 17 allows at least cutting unit 12 and/or the first conveyor 10 to be controlled to cut the labels 2 correctly in order to offset variations also after correct positioning of web 11.

Finally, it is clear that modifications and variants can be made to labelling machine 1 and the labelling method described and illustrated herein without departing from the scope of protection defined by the claims.

The invention claimed is:

1. A labelling machine (1) for applying labels (2) to receptacles (3) comprising:

a web (11) of labelling material positioned along a feed path (Q); said web (11) of labelling material having a succession of decorative patterns (15), each of which defining the extension of an individual label (2);

a cutting unit (12) configured to cut said web (11) of labelling material into individual labels (2) at a cutting station (13);

a conveying means (14) configured to advance the individual labels (2) from the cutting station (13) to at least one application station (5), at which the individual labels (2) are applied to the respective receptacles (3);

a control unit (17) configured to control the labelling machine (1) in at least one set-up configuration in which the web (11) of labelling material is positioned in relation to a reference station (18);

a determination device (19) configured to determine and/or detect at least in the set-up configuration of said labelling machine (1), a relative positioning of the decorative patterns (15) in relation to the reference station (18);

a removal device (20) configured to remove labels (2) from the conveying means (14) at a removal station (19), at least when said labelling machine (1) is controlled into the set-up configuration;

wherein said determination device (19) comprises a processing unit (32) configured to determine and/or detect the advancement of an incorrect label (2) by said conveying means (14), the detection of an incorrect label is detected as a function of the relative positioning of the decorative patterns (15) in relation to said reference station (18), the relative positioning of the decorative patterns is obtained as a function of an advancement position of said web (11) of said labelling material, and the individual label (2) is marked by the processing unit (32) as an incorrect label where said individual label has portions of two subsequent decorative patterns (15) or has a longitudinal length that differs from a predetermined length;

wherein said control unit (17) is configured to control at least said removal device (20) so as to remove said incorrect label (2) from the conveying means (14); and wherein the machine further comprises a position sensor configured to determine and/or detect an advancement position of said web (11) of labelling material.

2. The labelling machine according to claim 1, wherein said determination device (19) comprises:

a sensor (33) configured to generate a detection signal ($S_d$) indicative of visual characteristics of said decorative patterns (15);

a memory configured to store respective characterisation information associated with said decorative patterns (15), for a number of different types and/or formats of said decorative patterns (15); and a processing unit (32), operatively coupled with said sensor (33) and said memory, and configured to receive and process said detection signal ($S_d$) for determining the relative positioning of said decorative patterns (15);

wherein said processing unit (32) at least when in use, said labelling machine (1) is controlled in the set-up configuration, is configured so as to recover from said memory, as a function of a current type and/or format of said decorative patterns (15), the respective characterisation information, and to determine said relative positioning based on comparison between said characterisation information and information associated with said detection signal ($S_d$).

3. The labelling machine according to claim 2, wherein said processing unit (32) is also configured to obtain and store in a database incorporated in said memory said respective characterisation information for each type and/or format of said decorative patterns (15).

4. The labelling machine according to claim 3, wherein said processing unit (32) is configured such to obtain said characterisation information based on the detection signal ($S_d$) generated by said sensor (33) in association with a number of reference decorative patterns of said web (11) of labelling material.

5. The labelling machine according to claim 2, wherein said sensor (33) is configured to obtain said detection signal ($S_d$) as a function of variations of contrast and/or colours and/or light intensity in the image of said decorative patterns.

6. The labelling machine according to claim 1, wherein said removal device (20) comprises a suction assembly configured to generate a suction force for removing said incorrect label (2) from said conveying means (14).

7. The labelling machine according to claim 1, wherein said conveying means (14) comprises a conveyor drum (31) configured to retain the individual labels (2) during the advancement of the labels (2) from said cutting station (13) to at least said application station (5);

wherein said removal device (20) is arranged adjacent to said conveyor drum (31) at least at the removal station (21).

8. A method for applying labels (2) to receptacles (3) comprising:

providing a web (11) of labelling material along an advancement path; said web (11) of labelling material having a succession of repeated decorative patterns (15);

cutting said web (11) of labelling material into individual labels (2) at a cutting station (13);

advancing the individual labels (2) from the cutting station (13) to at least one application station (5) by a conveying means (14); and determining and/or detecting a relative positioning of the decorative patterns (15) in relation to a reference station (18) by a determination device (19);

wherein an incorrect label (2) is removed from the conveying means (14) depending on a relative positioning of the decorative patterns (15) in relation to the reference station (18);

wherein the method further comprises:

advancing the web (11) of labelling material along an advancement path; the patterns (15) comprising a succession of repeated decorative patterns (15), each of which defining the extension of an individual label (2);

positioning the web (11) of labelling material (2) in relation to a reference station (18) at least during a set-up step;

wherein the positioning step further comprises:

determining and/or detecting a relative positioning of the decorative patterns (15) in relation to the reference station (18);

determining and/or detecting the advancement of an incorrect label (2) as a function of the relative positioning of the decorative patterns (15) in relation to said reference station (18);

removing the incorrect labels (2) during the step of advancement of the labels (2) at a removal station (21);

wherein during the step of determining and/or detecting the advancement of an incorrect label, said incorrect label is detected also as a function of the advancement position of said web of labelling material.

9. The method according to claim 8, wherein the incorrect label is determined and/or detected as a function of the relative positioning of the decorative patterns (15) in relation to said reference station (18) if an individual label (2) has portions of two subsequent decorative patterns (15) and, if so, said label is marked as an incorrect label.

10. The method according to claim 8, wherein the relative positioning further comprising:

generating, by a sensor (33)*a* detection signal ($S_d$) indicative of visual characteristics of said decorative patterns (15);

receiving and processing, by a processing unit (32) operatively coupled to said sensor (33), said detection signal ($S_d$) to determine the relative positioning of said decorative patterns (15);

receiving, by the processing unit (32) from a memory operatively coupled to said processing unit (32), respective characterisation information associated with said decorative patterns (15), for a number of different types and/or formats of said decorative patterns (15);

wherein said processing unit (32) recovers from said memory, as a function of an actual type and/or format of said decorative patterns (15), the respective characterisation information, and determines said relative positioning based on a comparison between said characterisation information and information associated with said detection signal ($S_d$).

11. The method according to claim 10, wherein said processing unit (32) obtains said characterisation information based on the detection signal ($S_d$) generated by said sensor (33) in association with a number of reference decorative patterns of said web (11) of labelling material.

12. The method according to claim 10, wherein said detection signal ($S_d$) is a function of variations of contrast and/or colour and/or light intensity in the image of said decorative patterns (15).

13. The method according to claim 8, wherein during the advancement step of the web (11) of labelling material, a position sensor determines and/or detects an advancement position of said web (11) of labelling material.

14. The method according to claim 8, wherein, during said removal step, the incorrect label is removed through the application of a suction force onto said incorrect label.

15. The method according to claim 8, further comprising:

applying the individual labels (2), at least during an operating step, at the application station (5) to respective receptacles (3).

16. The method according to claim 8, wherein during the step of determining and/or detecting the advancement of an incorrect label, said incorrect label is detected also as a function of the advancement speed of said web of labelling material.

* * * * *